United States Patent [19]

Wecker

[11] Patent Number: 4,972,187
[45] Date of Patent: Nov. 20, 1990

[54] NUMERIC ENCODING METHOD AND APPARATUS FOR NEURAL NETWORKS

[75] Inventor: David B. Wecker, Colorado Springs, Colo.

[73] Assignee: Digital Equipment Corporation, Maynard, Mass.

[21] Appl. No.: 372,277

[22] Filed: Jun. 27, 1989

[51] Int. Cl.$^5$ .................................... H03M 7/02
[52] U.S. Cl. ..................... 341/95; 341/104; 341/105; 341/83; 364/513
[58] Field of Search ............ 341/82, 83, 84, 85, 341/102, 103, 95, 104, 105; 364/513

[56] References Cited

U.S. PATENT DOCUMENTS

| | | | |
|---|---|---|---|
| 4,773,024 | 9/1988 | Faggin et al. | 364/513 |
| 4,802,103 | 1/1989 | Faggin et al. | 364/513 |
| 4,855,742 | 8/1989 | Verboom | 341/103 |

*Primary Examiner*—William M. Shoop, Jr.
*Assistant Examiner*—H. L. Williams
*Attorney, Agent, or Firm*—Neuman, Williams, Anderson & Olson

[57] ABSTRACT

A numeric encoding method and apparatus for neural networks, encodes numeric input data into a form applicable to an input of a neural network by partitioning a binary input into N-bit input segments, each of which is replaced with a code having M adjacent logic ones and $2^N - 1$ logic zeros, the bit position of the least significant of the M logic ones corresponding to the binary value of the input segment it replaces. The codes are concatenated to form an encoded input. A decoding method decodes an output from the neural network into a binary form by partitioning the output into output segments having $2^N + M - 1$ bits each, each of which is replaced with an N-bit binary segment being a bracketed weighted average of the significances of logic ones present in the output segment. The binary segments are concatenated to form a decoded output.

15 Claims, 7 Drawing Sheets

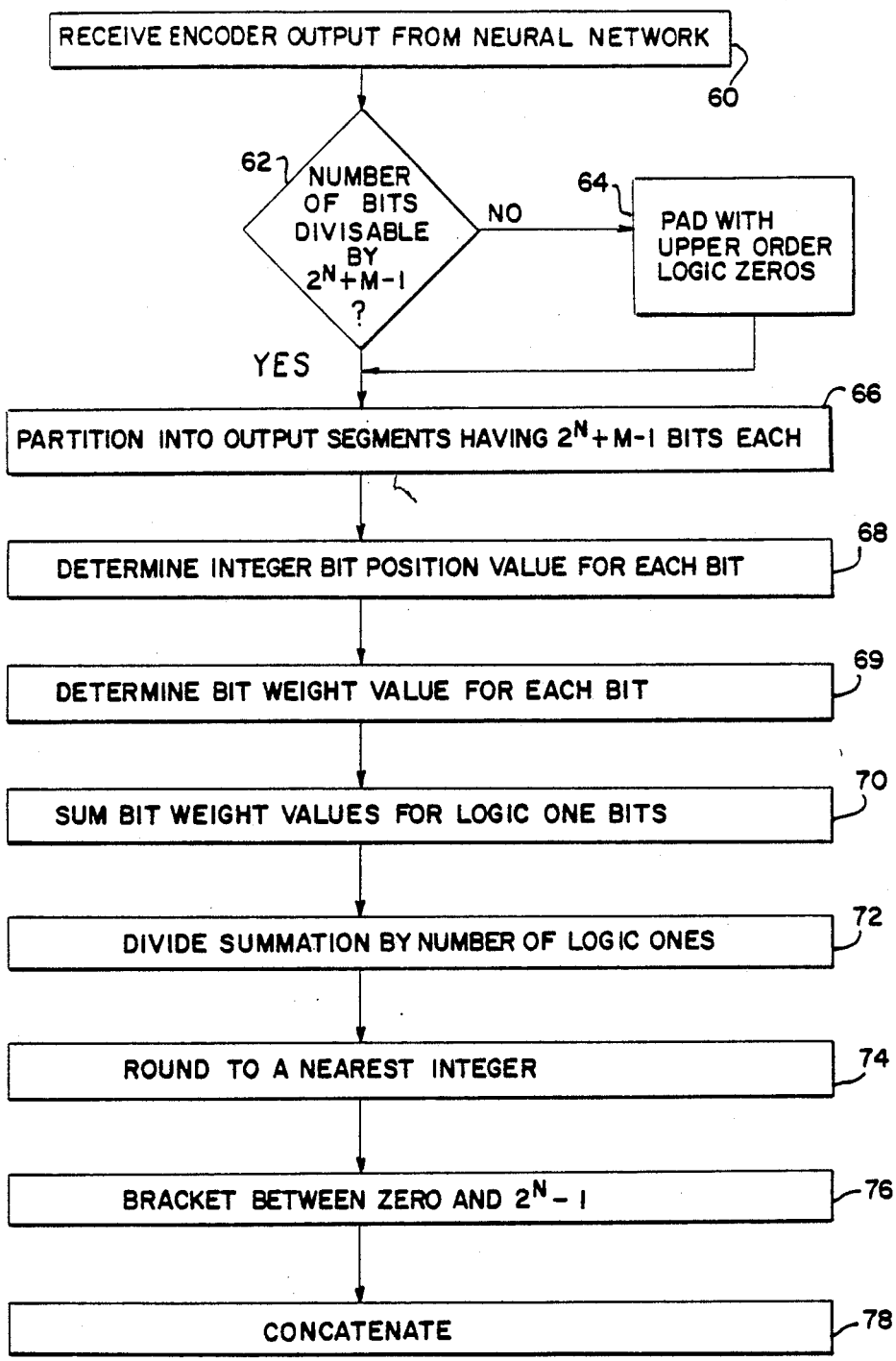

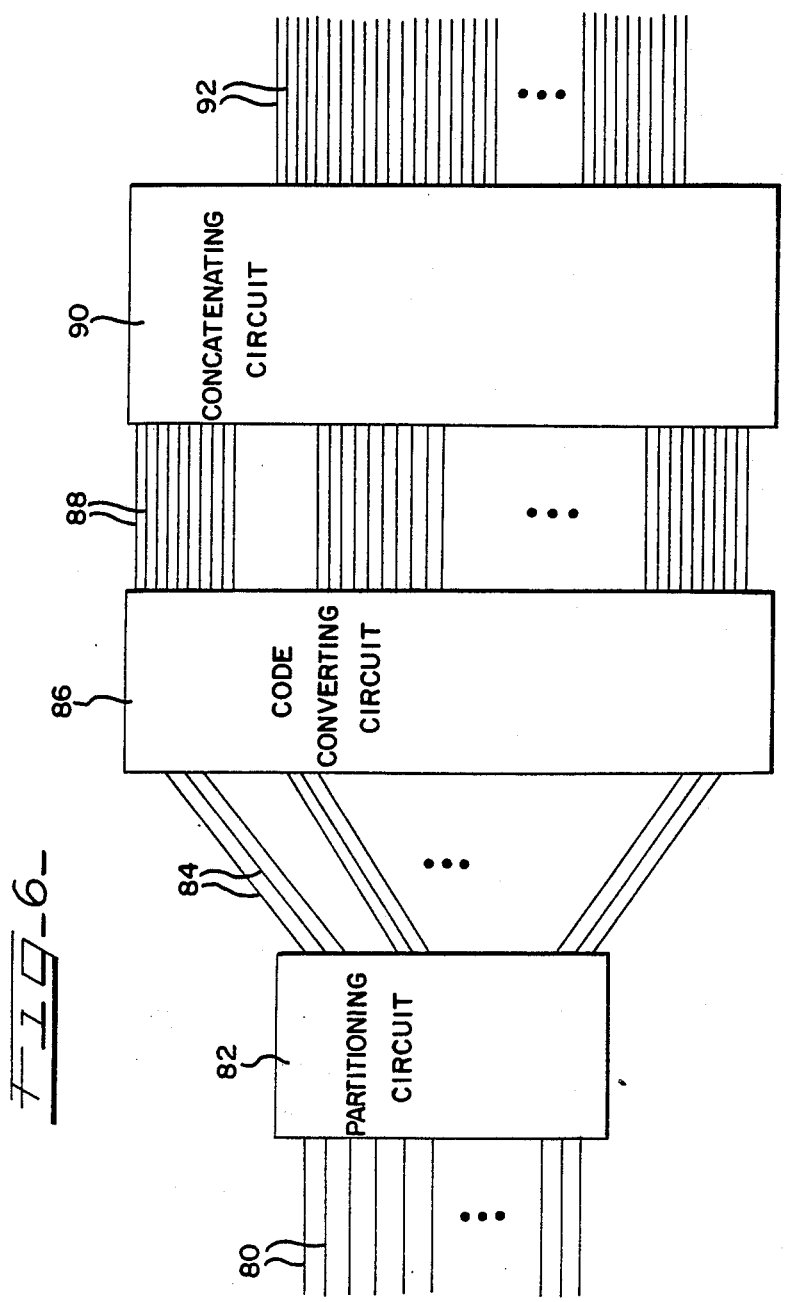

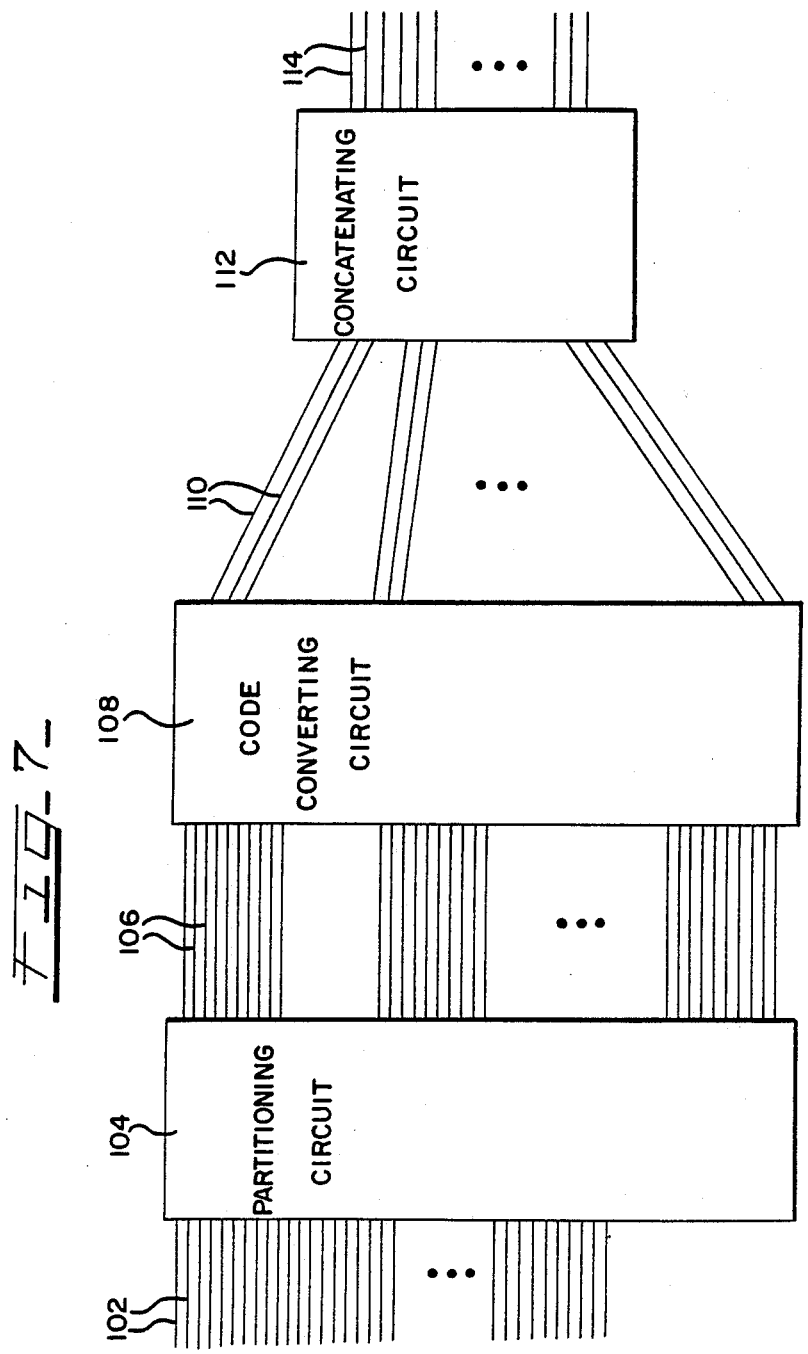
FIG-7-

NUMERIC ENCODING METHOD AND APPARATUS FOR NEURAL NETWORKS

FIELD OF THE INVENTION

The invention relates generally to the field of processing data with a neural network and, more particularly, to a method and apparatus for encoding numeric information for processing by a neural network.

BACKGROUND OF THE INVENTION

Neural Networks have been used for many years to solve certain types of computational problems. Especially amenable to solution by neural networks are problems where patterns of data or information need to be discovered or modeled. Neural networks and their applications are thus well known and are described by D. E. Rumelhart and J. L. McClelland in *Parallel Distributed Processing*, MIT Press, 1986.

Essentially, a neural network is a highly parallel array of interconnected processors that has the ability to learn and discover patterns from data that is input to the network. When the form of the input data has no meaning of its own, such as data contrived simply for the academic purpose of observing the network perform, the network operates well. However, when the form of the input data has meaning of its own and thereby presents a problem to the neural network, the solution of the problem by a neural network includes discovering the meaning of the input data form. The problem of presenting data to the input of a neural network in a form that minimizes the time needed and the problems associated with the network's discovering the meaning of the form of the input data has been referred to as "the encoding problem."

For numeric data, many encoding techniques have been used. Simple binary encoding has proven especially inefficient and difficult. With a binary encoded input, up to 90 percent of computational time of the neural network is spent learning the rules of binary number theory, e.g., that bit 1 is next to bit 0 and has value that is exactly twice as much. Nonetheless, binary is used because of the optimal density with which binary can represent information. For example, only 16 bits are needed to represent 65,536 different input values.

Temperature scale encoding has been used to overcome problems associated with binary encoding. With temperature scale encoding, successively higher input values are represented by causing successively higher bits to change state. For example, 0 is represented as 000000, 1 is represented as 000001, 2 is represented as 000011, 3 is represented as 000111, and so on. The meaning of the form of temperature scale-encoded input data is more easily recognizable by the neural network than that of a binary-encoded input, but temperature scale encoding has several drawbacks. One significant drawback is that 65,536 bits are needed to represent the same number of input values that can be represented by 16 binary bits. Thus temperature scale encoding has a low density of information content, and such a low density code necessitates an inordinately large neural network size to process a given problem. In addition, the temperature scale code provides no information regarding bit adjacency, so the neural network must spend a significant amount of time learning that bit 7 is next to bit 6, for example. Finally, since a temperature scale code results in more bits being logic ones for higher input values, higher input values result in a greater energy level applied to the input of the network. Despite this, the neural network must learn that all possible input values are equally important, whether high or low.

Some of the problems associated with the temperature scale code are obviated by using a grey scale encoding technique. With a grey scale code, successively higher bits alone represent successively higher input values. For example, an input value of 0 is represented as 000000, 1 is represented as 000001, 2 is represented as 000010, 3 is represented as 000100, and so on. Like a temperature scale code, the meaning of a grey scale code is more easily recognizable by the neural network than is a binary code. Furthermore, the same energy is presented to the network no matter what the input value is, so the network does not have to learn that each input value is as important as any other. However, grey scale code density is just as low as that of temperature scale encoding, necessitating a very large neural network to solve the simplest of problems. In addition, like temperature scale encoding, a grey scale code provides no information regarding bit adjacency.

A balanced binary code has been used to take advantage of the density of a binary code, while providing a constant energy input regardless of the input value. For instance, a 10-bit balanced binary code sequences like binary, but there are always 5 bits turned on and 5 bits turned off. Balanced binary code has the same drawbacks as the simple binary code referred to above.

Typically, any code, such as those discussed above or others, is chosen on an ad hoc basis depending upon the nature of the problem to be solved. No code has proven optimal for all problems, and the selection of a code or the development of an encoding process has proven troublesome, time consuming, and wasteful of computing resources. In addition, the magnitude of the encoding problem is increased since the output of a neural network must be appropriately decoded. The decoding processes which have been used, being merely the inverses of the encoding processes discussed above, suffer from the same inefficiencies and further limit network performance.

SUMMARY OF THE INVENTION

The present invention overcomes the foregoing and other shortcomings and drawbacks of methods heretofore used for encoding input information or data for a neural network by providing an encoding method that results in a dense and compact code that provides sufficient information to the network regarding bit adjacency and applies the same energy to the network regardless of input value. The invention further provides a method for decoding the output of a neural network that is equally efficient and tolerant of possible output values.

Numeric input data for a neural network, in binary form, is encoded by partitioning the binary input into input segments of three bits each, with each segment representing an octal value. Each input segment is replaced with a ten-bit code corresponding to its octal value and consisting of three logic ones and seven logic zeros, with the three logic ones occupying adjacent bit positions in the code and the least significant of the three logic ones occupying a bit position in the code of significance corresponding to the octal value of the input segment. The 10-bit codes replacing the respective three-bit input segments are concatenated. In addition, the relationship between the 10-bit codes is maintained corresponding to the relationship between the respective three-bit input segments of the binary input. The result of the concatenation is an encoded input, directly applicable to input neurons of a neural network, that is optimal for any numeric input data and is independent of the particular nature of the problem to be solved.

The encoded input is applied to the input neurons of the neural network, and an encoded output from the network is generated. The encoded output is decoded to form a human-interperable binary output by first partitioning the encoded output into ten-bit output segments. Each bit of each ten-bit output segment has a whole number bit position value of from zero to nine that corresponds to its significance within its segment and a bit weight value that is equal to its bit position value minus one.

Each ten-bit output segment is replaced with a three-bit binary segment that corresponds to a bracketed weighted average of logic ones in the ten-bit output segment. The three-bit binary segment is obtained by summing the bit weight values of all bits in the ten-bit output segment that consist of logic ones, dividing the summation by the number of bits in the ten-bit output segment that consist of logic ones, rounding the result of the division, or quotient, to a nearest integer and bracketing the rounded quotient between zero and seven, so that the outcome is represented as a three-bit binary segment.

The three-bit binary segments replacing the respective output segments are concatenated, maintaining a relationship between them corresponding to the relationship between the respective ten-bit output segments of the encoded output. The result of the concatenation is a decoded, human-interpretable binary output that is directly usable as a problem solution and relatable to the original binary input data. The decoding method is tolerant of the output in that all possible output combinations are valid and can be part of a meaningful output or solution to a problem.

BRIEF DESCRIPTION OF THE DRAWINGS

FIG. 2a shows an exemplary binary input which is processed by the neural network.

FIG. 2b shows the binary input partitioned into input segments according to the present invention.

FIG. 2c illustrates octal values representing the respective input segments.

FIG. 2d shows the input segments replaced with ten-bit codes respectively.

FIG. 2e illustrates concatenated ten-bit codes forming an encoded input applicable to input neurons of the neural network.

FIG. 3a shows an exemplary encoded digital output from output neurons of a neural network.

FIG. 3b illustrates the encoded output partitioned into output segments.

FIG. 3c shows the summation of bit weight values for the respective output segments.

FIG. 3d shows, for each of the respective output segments, the quotient resulting from dividing the summation by the number of bits consisting of logic ones.

FIG. 3e illustrates the respective quotients rounded to a nearest integer.

FIG. 3f illustrates the respective rounded quotients bracketed between values of zero and seven.

FIG. 3g illustrates the bracketed rounded quotients in binary form, forming partitioned three-bit binary segments.

FIG. 3h illustrates concatenated three-bit binary segments forming a decoded binary output.

FIG. 5 illustrates a flow chart of the decoding aspect of the present invention.

FIG. 6 illustrates a block diagram of an apparatus implementing the encoding aspect of the present invention.

FIG. 7 illustrates a block diagram of an apparatus implementing the decoding aspect of the present invention.

DETAILED DESCRIPTION

Figure 1:
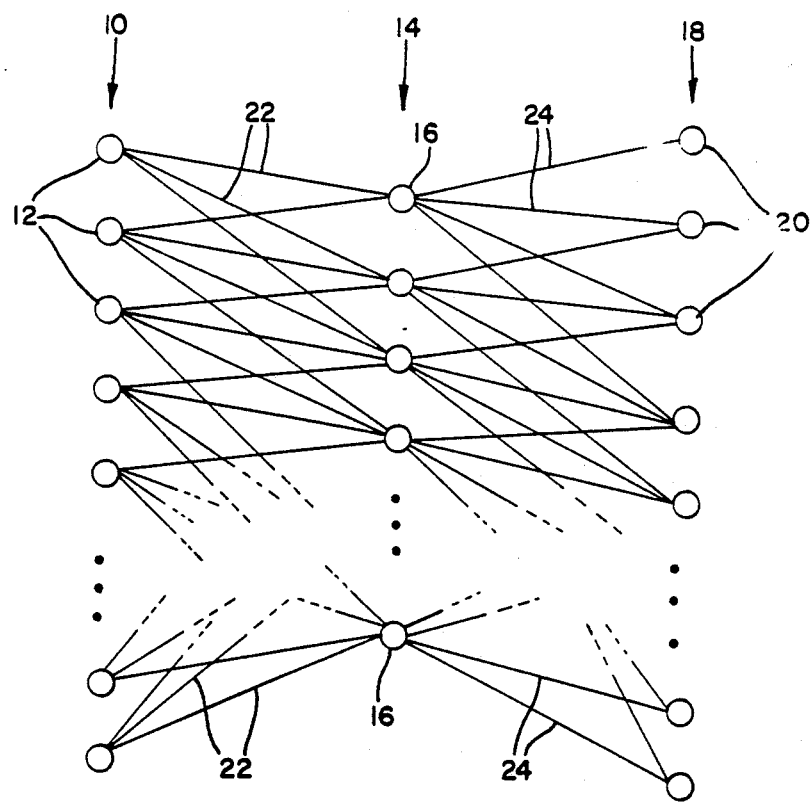
FIG. 1 is a partial schematic illustration of the topology of a neural network using the present invention.

Referring now to FIG. 1, a partial schematic illustration of the topology of a neural network using the present invention is shown. Neurons, which are individual processor units, are represented as small circles and are arranged, for example, in three successive layers, an input layer 10 of input neurons 12, a hidden layer 14 of hidden neurons 16 and an output layer 18 of output neurons 20. Each input neuron 12 is coupled with one or more hidden neurons 16 via interconnections 22, and each hidden neuron 16 is coupled with a plurality of output neurons 20 via interconnections 24. FIG. 1 is exemplary in that the present invention is used with neural networks regardless of the specific topology thereof. For instance, there may be any number of neurons in any layer, there may be any number of layers and there may be any configuration of interconnections between the layers. The method of the present invention is of general application to the solution of numeric problems with any suitable neural network.

Pursuant to the invention, binary input data is encoded and applied to the input of a neural network for processing, and the encoded output is retrieved from the output of the neural network and is then decoded to form a binary output. FIG. 2a shows an exemplary binary input which, according to the invention, is encoded and applied to the input neurons of a neural network. The binary input represents any numeric data desired to be processed by a neural network and comprises any number of bits. As described below, the binary input is partitioned into input segments of N bits each, where N is any suitable integer and is preferably three. FIG. 2b shows the binary input of FIG. 2a partitioned into three-bit input segments. If the binary input is not evenly partitionable into N-bit segments because the input number is not a multiple of N, the binary input is first padded with upper order zeros, as described below, so that an even partitioning can be made.

Each input segment of the binary input represents a binary value. For the preferred three-bit segments, the binary value is an octal value of from zero to seven. FIG. 2c shows the octal values of the respective three-bit input segments shown in FIG. 2b. For input segments of arbitrary N-bit length, the binary value of each segment would be from zero to $2^N-1$.

Using a suitable code conversion technique, as described more fully hereinafter, each input segment is replaced with, or is converted into, a code corresponding to the binary value and having $2^N+M-1$ bits, where M is a integer of logic ones present in the code.

In the preferred method, as shown by way of example in FIG. 2d, each three-bit input segment is replaced with a ten-bit code having three logic ones and seven logic zeros. Thus, while M may be any integer, M is preferably equal to three. Referring to FIG. 2d, the three logic ones occupy adjacent bit positions in the code, and the least significant logic one occupies a bit position corresponding to the binary value of the relative input segment that that code replaces. As is well known, "bit position" refers to a number used to identify the position of a bit in a code, that is between zero and $2^N-1$, where N is the number of bits in the code, and increases as the significance of the bit in question increases in the code. The replacement of a preferred three-bit input segment is governed by the translation defined in Table 1.

TABLE 1

| Input Segment | Code |
|---|---|
| 000 | 0000000111 |
| 001 | 0000001110 |
| 010 | 0000011100 |
| 011 | 0000111000 |
| 100 | 0001110000 |
| 101 | 0011100000 |
| 110 | 0111000000 |
| 111 | 1110000000 |

As indicated above, any number, M, of adjacent logic ones may be used in the code, so that with an input segment of N bit length, the number of adjacent logic ones in the code is M, the number of logic zeros in the code is $2^N-1$ and the code has a total number of bits equal to $2^N+M-1$. While the bit lengths of the input segment and the code and the number of logic ones in the code may vary for arbitrary values of N and M, the M logic ones in the code replacing each input segment occupy adjacent bit positions and the least significant of the M logic ones occupies a bit position corresponding to the binary value of that input segment.

As shown in FIG. 2d, the ten-bit codes replacing the three-bit input segments have relationships among themselves that correspond to the relationships among the respective three-bit input segments. This relationship is maintained, and the ten-bit codes are concatenated, or joined together end-to-end, as more fully described hereinafter, to form an encoded input as shown in FIG. 2e. For arbitrary values N and M, the number of bits in each input segment and the number of bits in each respective code may vary, but the codes are nonetheless concatenated as described above to form an encoded input.

The encoded input, which may have any suitable number of bits, is applied to input neurons of a neural network. Each bit of the encoded input is applied to one input neuron, and no input neuron receives more than one bit of the encoded input. Thus, for an encoded input having fifty bits as shown in FIG. 2e, there must be at least fifty input neurons in the network. The neural network is trained, in a suitable well known manner, with corresponding output data encoded as described above and applied to the network output. By this, the neural network learns patterns from the data in encoded form. A problem is then solved by the network by applying an encoded input to the network and suitably enabling the network to generate an output. The network having been trained according to the encoding method of the present invention, the output present from the output neurons is in an encoded form. The present invention includes a method for decoding the encoded output to form an ordinary binary output that is human-interpretable and relatable to the numeric input data that is processed by the network.

FIG. 3a illustrates an exemplary encoded digital output that is generated by the network after the network has been trained and an encoded input, such as that shown in FIG. 2e, is input to the network. The encoded output may consist of any suitable number of bits, such as fifty, as shown in FIG. 3a. As set forth more completely below, the encoded output is partitioned into output segments of $2^N+M-1$ bits each, where N and M may be arbitrary values but correspond to the values N and M used in the encoding process set forth above. In the preferred method, as described above, N and M each have a value of three. Thus, the encoded output is preferably partitioned into output segments of ten bits each, as illustrated in FIG. 3b. As with the input data described above, if the encoded output is not evenly partitionable into output segments of $2^N+M-1$ bits each, high order logic zeros are included in the encoded output so that even partitioning can be made.

Each bit of each output segment has an integer bit position value of from zero to $2^N+M-2$, corresponding to the significance of the bit within its output segment. In the preferred method, the integer bit position value for each bit of each ten-bit output segment is from zero to nine. Each such bit also has a bit weight value that is equal to its bit position value minus $(M-1)/2$. In the preferred method, the bit weight value for each such bit is equal to the bit position value minus one and ranges from $-1$ to $+8$, depending upon the significance of the bit in question within its output segment.

Each output segment is replaced by, or converted into, a bracketed weighted average of the significances of the logic ones present in the output segment, represented as an N-bit binary segment. For each output segment, this is accomplished by summing the bit weight values of all bits in the output segment that consist of logic ones. FIG. 3c shows such summations for the respective output segments shown in FIG. 3b. The summation is divided by the number of bits in the output segment that consist of logic ones, if any, and a quotient is formed. FIG. 3d shows the quotients for the respective summations shown in FIG. 3c. The quotient is rounded to a nearest integer, as shown in FIG. 3e, for the respective quotients of FIG. 3d. Finally, the rounded quotient is bracketed between zero and $2^N-1$, so that any rounded quotient less than zero is made equal to zero and any rounded quotient greater than $2^N-1$ is made equal to $2^N-1$. For the preferred method, as illustrated in FIG. 3f, the rounded quotient is bracketed between values of zero and seven.

The bracketed rounded quotient, or bracketed weighted average of the significances of the logic ones present in the output segment, is represented by and forms an N-bit binary segment. In the preferred method, such binary segments are three bits in length, as shown in FIG. 3g for the respective bracketed rounded quotients of FIG. 3f. The N-bit binary segments have relationships among themselves corresponding to the relationships among the respective output segments that are replaced thereby. Maintaining such a relationship, the binary segments are concatenated to form a decoded binary output as shown in FIG. 3h.

Figure 4:
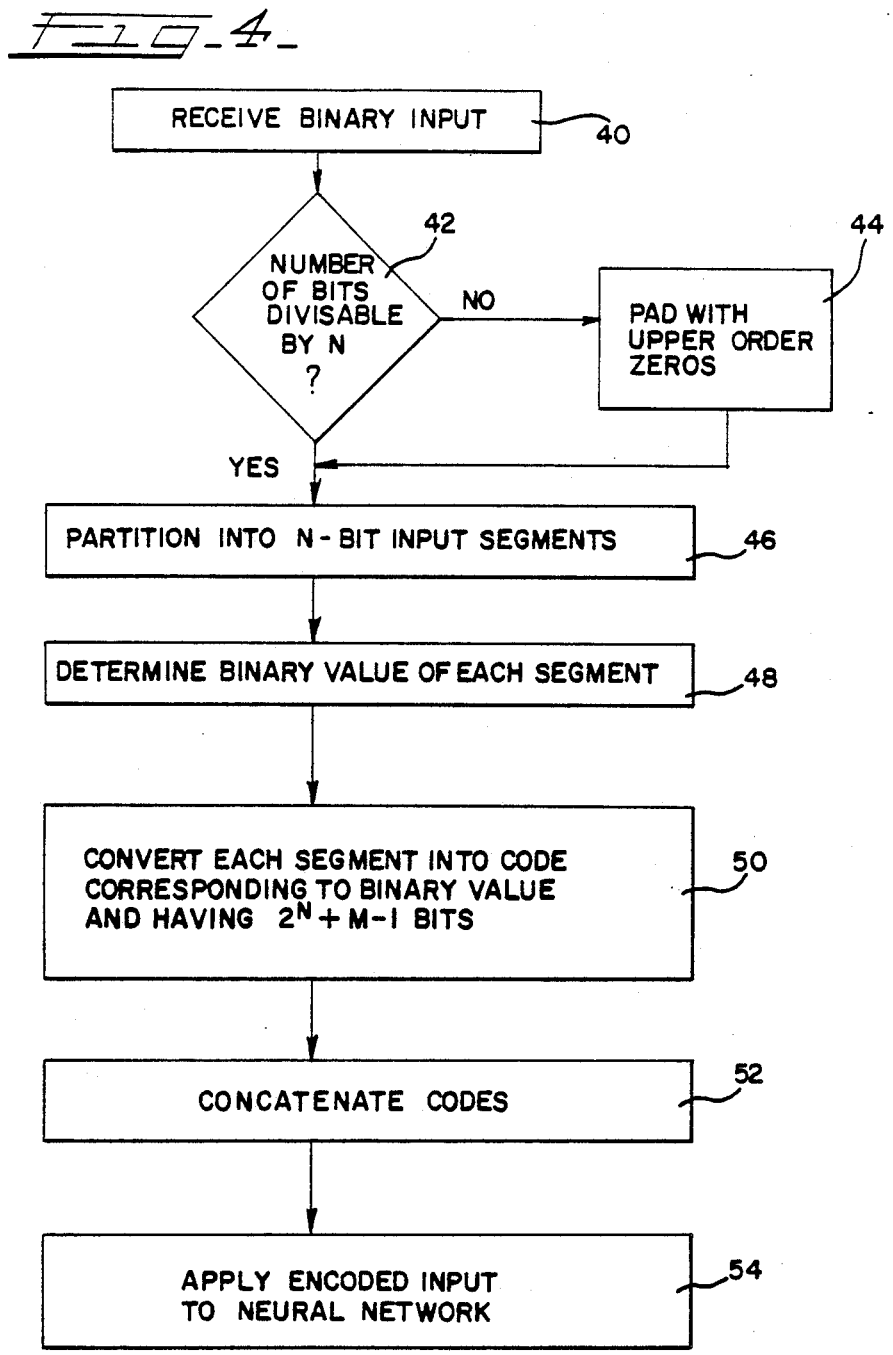
FIG. 4 illustrates a flow chart of the encoding aspect of the present invention.

The encoding and decoding aspects of the method of the present invention thus described are further understood with reference to FIGS. 4 and 5. FIG. 4 is a flow chart illustrating the encoding method described above.

Binary input data, in ordinary base two form, is received at step 40. A decision is then made at step 42 as to whether the number of bits in the binary input is evenly partitionable into segments having N bits each. If not evenly partitionable, the binary input is padded at step 44, with an appropriate number of upper order logic zeros so that even partitioning can be made. If evenly partitionable, or after padding with zeros, the binary input, at step 46, is partitioned into N-bit input segments. Each input segment has an ascertainable binary value of from zero to $2^N-1$ which is determined at step 48. Each input segment is then, at step 50, converted into or replaced with a code corresponding to the binary value and having $2^N+M-1$ bits, where M is the number of adjacent logic ones in the code. At step 52, to form an encoded input, the codes are concatenated, while maintaining a relationship between them corresponding to that between the N-bit input segments respectively. At step 54, the encoded input is applied to input neurons of the neural network.

FIG. 5 is a flow chart illustrating the decoding method described above. An encoded output from a neural network is received at step 60. A decision is then made at step 62 as to whether the number of bits in the encoded output is evenly partitionable into segments having $2^N+M-1$ bits each. If not evenly partitionable, the encoded output is padded, at step 64, with an appropriate number of upper order logic zeros so that even partitioning can be made. If evenly partitionable, or after padding with zeros, the encoded output, at step 66, is partitioned into output segments having $2^N+M-1$ bits each. Each bit of each output segment has an ascertainable integral bit position value of from zero to $2^N+M-2$ which is determined at step 68. Each bit of each output segment further has an ascertainable bit weight value, equal to its bit position value minus $(M-1)/2$, which is determined at step 69. For each output segment, the bit weight values of all bits consisting of logic ones are summed at step 70. The summation, for each output segment, is divided at step 72 by the number of logic ones present in that output segment, if any, and a quotient is formed. The quotient, for each output segment, is rounded at step 74 to a nearest integer. The rounded quotient, for each output segment, is bracketed at step 76 between values of zero and $2^N-1$, forming an N-bit binary segment. At step 78, the N-bit binary segments corresponding to the output segments are concatenated to form a decoded binary output.

The method of the present invention is implementable in software or by way of a dedicated hardware encoder/decoder, depending upon the needs of a particular application and whether the neural network itself is implemented in hardware or software. It is especially advantageous to implement the present invention in hardware where a dedicated numerical problem solver is desired. Referring to FIG. 6, an apparatus for implementing the encoding aspect of the present invention is shown.

Ordinary binary input data is present on input lines 80. Input lines 80 are input to a partitioning circuit 82 which partitions the input lines 80 into groups of N lines each, where N is preferably equal to three. Partitioning circuit 82 further pads the input data on input lines 80 with upper order logic zeros if necessary to be able to evenly partition input lines 80 into groups of N lines each. Partitioning circuit 82 may, for example, simply function to physically separate the input lines 80 into N-line groups, and padding with logic zeros may be accomplished by simply grounding the upper order partitioned lines 84 of the uppermost N-line group that are of significance greater than the most significant of the input lines 80, if any.

Partitioned lines 84 are provided to a code converting circuit 86. Code converting circuit 86 receives each group of N partitioned lines and converts the value represented by the N binary bits present on such lines into a code having $2^N+M-1$ bits as described above, where M is a number of adjacent logic ones and is preferably three. In the preferred illustrated embodiment, each three-bit binary value, corresponding to a group of partitioned lines 84, is converted into a ten-bit code in accordance with Table 1. Code converting circuit 86 may accomplish the conversion by any well known means, such as with a suitable combinational logic network or a suitably programmed read-only memory. Additionally, code converting circuit 86 may include separate conversion hardware for each group of partitioned lines 84, so that the code conversion for all groups take place simultaneously, or it may include hardware capable of converting only one group of partitioned lines 84 at a time, so that the code conversion for the groups takes place sequentially.

The codes, each having $2^N+M-1$ bits, are present on lines 88 from code converting circuit 86. Concatenating circuit 90 receives the codes on lines 88 and concatenates them to form an encoded input on lines 92. Concatenating circuit 90 may, for example, simply physically combine or bring together lines 88 so that a single digital encoded input is present on lines 92. Concatenating circuit 90 operates to concatenate or join together end-to-end the codes present on lines 88. The encoded input on lines 92 is applicable to the input neurons of a neural network, and the output neurons for training purposes, as described above.

Referring to FIG. 7, an apparatus for implementing the decoding aspect of the present invention is shown. Encoded digital output data from the output neurons of a neural network is present on lines 102. Lines 102 are input to a partitioning circuit 104 which partitions lines 102 into groups of $2^N+M-1$ lines each, where N and M are any suitable positive integers and are each preferably three, as described above. Partitioning circuit 104 further pads the encoded digital output data on lines 102 with upper order logic zeros if necessary to permit lines 102 to be evenly partitioned into groups of $2^N+M-1$ lines each. Partitioning circuit 104 may, for example, simply physically separate lines 102 into appropriate groups, and padding with logic zeros may be accomplished by simply grounding the upper order partitioned lines 106 of the uppermost group that are of significance greater than the most significant of the lines 102, if any.

Partitioned lines 106 are provided to a code converting circuit 108. Code converting circuit 108 receives each group of partitioned lines 106 and converts the digital information on such lines into a binary value having N bits, as described above. Code converting circuit 108 may accomplish the conversion using any one of a number of commonly used techniques such as with a suitable combinational logic network, a suitably programmed read-only memory or a computational sequence carrying out the steps as described above with reference to FIGS. 3c, 3d, 3e, 3f and 5.

The N-bit binary values are present on lines 110 from code converting circuit 108. Concatenating circuit 112 receives the N-bit binary values on lines 110 and concatenates them to form a decoded binary output on lines 114. Concatenating circuit 112 may, for example, simply physically bring together lines 110 so that a single binary decoded output is present on lines 114. The decoded output on lines 114 is in simple binary form and is directly relatable to binary input data present on lines 80 of FIG. 6.

The above illustrative embodiment depicts a method for processing numeric data with a neural network, including optimal methods for encoding input data and decoding an output from the network. The encoding method is very dense, only three and one-third times less dense than binary. Encoded input values give the network needed contextual information regarding bit adjacency, making it orders of magnitude easier for the network to solve a given problem than when conventional encoding is used. Regardless of the input value, the encoded input applied to the network has the same number of logic ones, making it easier for the network to understand that any one input value is just as important as any other. Thus, the code is compact and can be learned very quickly by the network. The output decoding method efficiently translates the output into binary form and is tolerant of the network in that any possible output is valid and is usable as output information. Each aspect of the method being exemplary, the scope of the invention is not intended to be limited to the specific embodiments shown or discussed. Instead, the scope of the invention is intended to encompass those modifications and variations that may be apparent to those persons skilled in the art to which the subject matter pertains.

What is claimed is:

1. A method for encoding a binary input into a form applicable to input neurons of a neural network comprising the steps of:

partitioning said input into groups of three bits, the bits of each three-bit group representing an octal value; and replacing each three-bit group with a group of ten bits corresponding to said octal value, said ten-bit group consisting of three logic ones and seven logic zeros, said three logic ones occupying adjacent bit positions with the least significant of said three logic ones occupying a bit position of significance corresponding to said octal value.

2. A method for encoding a binary input into a form applicable to input neurons of a neural network comprising the steps of:

partitioning said input into groups of three bits, the bits of each three-bit group representing an octal value;

replacing each three-bit group with a group of ten bits corresponding to said octal value, said ten-bit group consisting of three logic ones and seven logic zeros, said three logic ones occupying adjacent bit positions with the least significant of said three logic ones occupying a bit position of significance corresponding to said octal value; and concatenating said ten-bit groups, while maintaining a relationship therebetween corresponding to that between said three-bit groups respectively.

3. A method for decoding a digital output from a neural network into a binary output comprising the steps of:

partitioning the digital output into ten-bit output segments;

replacing each of said ten-bit output segments with a three-bit binary segment corresponding to a bracketed weighted average of the significances of logic ones present in said output segment; and concatenating said three-bit binary segments to form the binary output.

4. A method for decoding a digital output from a neural network into a binary output comprising the steps of:

partitioning the digital output into groups of ten-bit output segments, each bit of each group having a bit position value of from zero to nine corresponding to its significance within its group and a bit weight value equal to its bit position value minus one;

converting each of said ten-bit output segments into a three-bit binary segment, said binary segment being a bracketed average of the bit weight values of all bits of said output segment that consist of logic ones; and concatenating said three-bit binary segments to form the binary output.

5. A method for decoding a digital output from a neural network into a binary output comprising the steps of:

A. partitioning the digital output into groups of ten-bit output segments, each bit of each group having a bit position value of from zero to nine corresponding to its significance within its group and a bit weight value equal to its bit position value minus one;

B. converting each of said ten-bit output segments into a three-bit binary segment, said converting step comprising the steps of:
  1. summing said bit weight values of all bits of said output segment that consist of logic ones;
  2. dividing said summation by the number of bits of said output segment that consist of logic ones, if any, to form a quotient;
  3. rounding said quotient to a nearest integer; and
  4. bracketing said rounded quotient between values of zero and seven to form a three-bit binary segment; and C. concatenating said three-bit binary segments to form the binary output.

6. A method for processing numeric data with a neural network comprising the steps of:

A. encoding a binary input into a form directly applicable to input neurons of the neural network, said encoding step comprising the steps of:
  1. partitioning said input into input segments of N bits each, each of said input segments representing a binary value;
  2. replacing each input segment with a code corresponding to said binary value and consisting of M logic ones and $2^N-1$ logic zeros, said M logic ones occupying adjacent bit positions in said code with the least significant of said M logic ones occupying a bit position in said code of significance corresponding to said binary value; and
  3. concatenating said codes to form an encoded input;

B. applying said encoded input to the input neurons of the neural network and generating an encoded output from the neural network; and C. decoding said encoded output to form a binary output, said decoding step comprising the steps of:

1. partitioning said encoded output into output segments of $2^N+M-1$ bits each, each bit of each segment having an integer bit position value of from zero to $2^N+M-2$ corresponding to its significance within its output segment and a bit weight value equal to its bit position value minus $(M-1)/2$;
2. replacing each output segment with an N-bit binary segment, said binary segment being a bracketed average of all bits of said output segment that consist of logic ones; and
3. concatenating said N-bit binary segments to form said binary output.

7. A method for processing numeric data with a neural network comprising the steps of:
   A. encoding a binary input into a form directly applicable to input neurons of the neural network, said encoding step comprising the steps of:
      1. partitioning said input into input segments of N bits each, each of said input segments representing a binary value;
      2. replacing each input segment with a code corresponding to said binary value and consisting of M logic ones and $2^N-1$ logic zeros, said M logic ones occupying adjacent bit positions in said code with the least significant of said M logic ones occupying a bit position in said code of significance corresponding to said binary value; and
      3. concatenating said codes to form an encoded input;
   B. applying said encoded input to the input neurons of the neural network and generating an encoded output from the neural network; and
   C. decoding said encoded output to form a binary output, said decoding step comprising the steps of:
      1. partitioning said encoded output into output segments of $2^N+M-1$ bits each, each bit of each segment having an integer bit position value of from zero to $2^N+M-2$ corresponding to its significance within its output segment and a bit weight value equal to its bit position value minus $(M-1)/2$;
      2. converting each output segment into an N-bit binary segment, said converting step comprising the steps of:
         a. summing said bit weight values of all bits of said output segment that consist of logic ones;
         b. dividing said summation by the number of bits of said output segment that consist of logic ones, if any, to form a quotient;
         c. rounding said quotient to a nearest integer; and
         d. bracketing said rounded quotient between values of zero and $2^N-1$, forming an N-bit binary segment; and
      3. concatenating said N-bit binary segments to form said binary output.

8. The method of claim 7 wherein N is equal to three and M is equal to three.

9. A method for encoding a binary input into a form applicable to input neurons of a neural network comprising the steps of:
partitioning the input into input segments of N bits each, each of said input segments representing a binary value;
replacing each N-bit segment with a code corresponding to said binary value and consisting of M logic ones and $2^N-1$ logic zeros, said M logic ones occupying adjacent bit positions in said code with the least significant of said M logic ones occupying a bit position in said code of significance corresponding to said binary value; and
concatenating said codes to form an encoded input.

10. A method for decoding a digital output from a neural network into a binary output comprising the steps of:
partitioning the digital output into output segments of $2^N+M-1$ bits each, each bit of each segment having an integer bit position value of from zero to $2^N+M-2$ corresponding to its significance within its segment and a bit weight value equal to its bit position value minus $(M-1)/2$;
converting each output segment into a N-bit binary segment, said binary segment being a bracketed average of the bit weight values of all bits of said output segment that consist of logic ones; and
concatenating said N-bit binary segments to form the binary output.

11. A method for decoding a digital output from a neural network into a binary output comprising the steps of:
   A. partitioning the digital output into output segments of $2^N+M-1$ bits each, each bit of each segment having an integer bit position value of from zero to $2^N+M-2$ corresponding to its significance within its segment and a bit weight value equal to its bit position value minus $(M-1)/2$;
   B. converting each output segment into an N-bit binary segment, said converting step comprising the steps of:
      1. summing said bit weight values of all bits of said output segment that consist of logic ones;
      2. dividing said summation by the number of bits of said output segment that consist of logic ones, if any, to form a quotient;
      3. rounding said quotient to a nearest integer; and
      4. bracketing said rounded quotient between values of zero and $2^N-1$ to form an N-bit binary segment; and
   C. concatenating said N-bit binary segments to form the binary output.

12. An encoder for encoding a binary input into a form applicable to input neurons of a neural network comprising:
means for partitioning the input into input segments of N bits each, each of said input segments representing a binary value;
means for converting each N-bit segment into a code corresponding to said binary value and consisting of M logic ones and 2N−1 logic zeros, said M logic ones occupying adjacent bit positions in said code with the least significant of said M logic ones occupying a bit position in said code of significance corresponding to said binary value; and
means for concatenating said codes to form an encoded input.

13. The encoder of claim 12 wherein N is equal to three and M is equal to three.

14. A decoder for decoding a digital output from a neural network into a binary output comprising:
means for partitioning the digital output into output segments of $2^N+M-1$ bits each, each bit of each segment having an integer bit position value of from zero to $2^N+M-2$ corresponding to its significance within its segment and a bit weight value equal to its bit position value minus $(M-1)/2$;

means for converting each output segment into a N-bit binary segment, said binary segment being a bracketed average of the bit weight values of all bits of said output segment that consist of logic ones; and means for concatenating said N-bit binary segments to form the binary output.

15. The decoder of claim 14 wherein N is equal to three and M is equal to three.

* * * * *